L. E. GARNETT.
PALLET SETTING AND ADJUSTING TOOL.
APPLICATION FILED AUG. 3, 1909.
956,956.
Patented May 3, 1910.
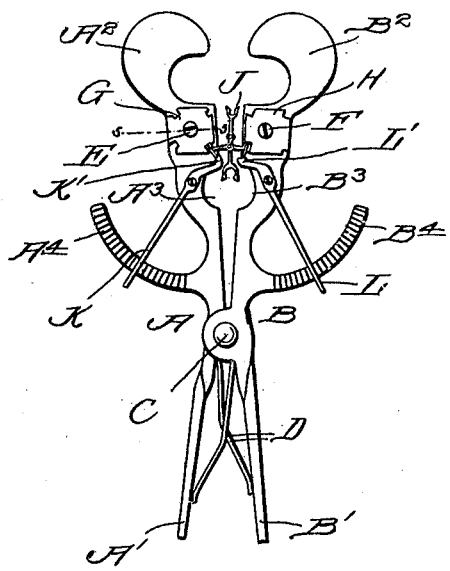
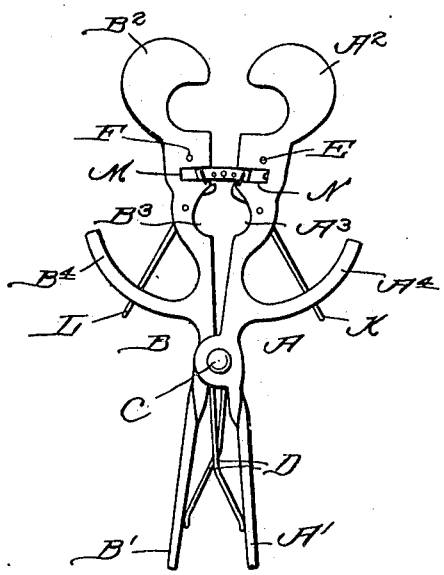
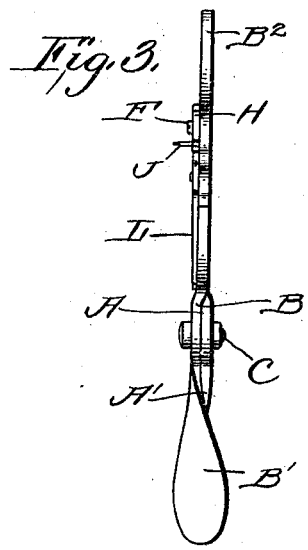
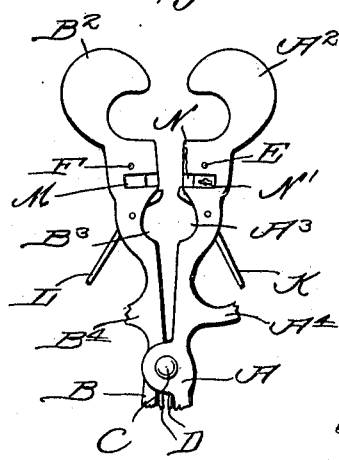
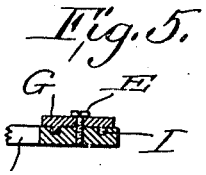
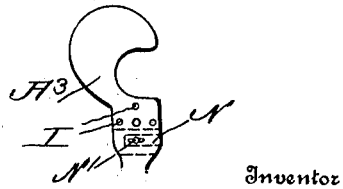
Inventor
Lemuel E. Garnett

UNITED STATES PATENT OFFICE.

LEMUEL EDWARD GARNETT, OF CHANUTE, KANSAS.

PALLET SETTING AND ADJUSTING TOOL.

956,956.  Specification of Letters Patent.  Patented May 3, 1910.

Application filed August 3, 1909. Serial No. 511,049.

*To all whom it may concern:*

Be it known that I, LEMUEL E. GARNETT, a citizen of the United States, residing at Chanute, in the county of Neosho and State of Kansas, have invented a new and useful Improvement in Pallet Setting and Adjusting Tools, of which the following is a specification.

This invention relates to pallet setting and adjusting tools especially adapted to be used by watch makers and repairers, the object being to provide a tool which is so constructed that the pallet stones of watch escapement pallets can be easily and quickly set in position.

Another object of my invention is to provide a tool which can be used for setting the pallet stones of a straight line or parallel pallet or any other kind of pallet easily and quickly.

A further object of my invention is to provide a tool which is so constructed that the pallet can be easily and quickly placed in position to set the stones or detach the same therefrom after the stone has been set.

A still further object of the invention is to provide the jaws of the tool with adjustable jaw faces whereby the faces can be adjusted to accommodate different styles of pallets.

Still another object of my invention is to provide the jaws of the tool with levers which are adapted to force the pallet stones into their sockets, said levers working over graduated arms whereby the exact adjustment can be obtained.

With these objects in view, my invention consists in the novel features of construction, arrangement and combination of parts, hereinafter fully described, pointed out in the claims and shown in the accompanying drawing, in which:

Figure 1 is a plan view of my improved pallet setting and adjusting tool showing a pallet in position therein with the levers in position to set the stones. Fig. 2 is an inverted plan view showing a different style pallet arranged in the recesses formed in the jaws to receive the same. Fig. 3 is a side elevation of my improved tool. Fig. 4 is a detail plan view of Fig. 2 showing the pallet removed. Fig. 5 is an enlarged section taken on the line 5—5 of Fig. 1, and Fig. 6 is a detail plan view of one of the jaws showing the jaw face removed.

In carrying out my improved invention, I employ a pair of pivoted jaws A and B which are pivotally connected together by a screw C and are provided with handles A', B' between which are arranged spring members D for holding the handles apart so that the jaws will be held into contact with each other at all times. The jaws are provided with enlarged flattened head portions $A^2$, $B^2$ adapted to be heated by an ordinary alcohol lamp so as to soften the cement used in setting the pallet stones as will be hereinafter fully described.

Threaded bores are formed in the face of the jaws A and B in which are mounted screws E and F which extend through adjustable jaw faces G and H which are provided with pins adapted to fit within recesses I formed in the jaws so that the jaw faces will be held rigidly in their adjusted positions and these jaw faces are provided with notched corners adapted to receive the different styles of pallets. By loosening the screws E and F and raising the jaw faces G and H upwardly so as to disengage the pins from the recesses, the jaw faces can be readily adjusted by forcing the same downwardly into another recess and by tightening up on the screw, it will be held firmly in position.

After the jaw faces have been adjusted to bring the notches in the desired registry with each other by pressing the handles A', B' together the jaws can be opened so that a pallet J can be readily placed in the notches and by releasing the handles, the springs will force the handles apart so as to force the jaws together so that the pallet will be held firmly in position. The jaws are cut away as clearly shown at $A^3$, $B^3$ to receive the fork of the pallet. It will be seen that when the pallet is in position on the tool as clearly shown in Fig. 1, the stone sockets will be held in the notches of the jaw faces and the sides of the jaws in such a manner that when a stone is placed within the socket, it will be held therein in such a manner that all danger of the same slipping before the stone is forced into place is prevented.

Pivotally mounted on the jaws A and B are setting levers K and L which are provided with different shaped heads K', L' as clearly shown to suit the angles of the pallet sockets so that when the pallets have been placed in position within the sockets to be forced tightly into the same, the respective heads of the levers will bear evenly upon the outer faces of the pallet stones and it will be seen that by forcing the levers inwardly or together the stones will be forced into the stone sockets evenly. It is of course understood that the heads have been heated so as to soften the cement used for holding the pallet stones in position before the levers are operated if the stones are being set in a new pallet, but if one of the stones of a pallet accidentally works loose or gets out of place in any way by heating the respective heads, the cement of the socket carried thereby will only be softened so that by operating the respective levers, the pallet-stone can be forced back into position.

For returning and setting of the pallet stones, I provide the jaws A and B with curved graduated arms $A^4$, $B^4$ over which are adapted to work the ends of the levers K and L which are held into engagement with the arms by frictional contact, and it will be seen that by this arrangement, the stones can be evenly set.

Arranged in the under sides of the jaws A and B are notches or recesses M and N which register with each other when the jaws are forced together by the spring D and the end is provided with an opening having a slot communicating therewith upon opposite sides as clearly shown at N' and each of these recesses are preferably stepped as clearly shown and are especially adapted to be used for holding a pallet of a construction as clearly shown. A pallet of this construction is provided with a pin which is adapted to fit within the opening N' and it will be seen that the pallet can be easily and quickly placed in position or removed therefrom by simply opening and closing the jaws.

Having thus fully described my invention, what I claim as new and desire to secure by Letters Patent, is:

1. A pallet setting and adjusting tool comprising a pair of pivoted jaws for holding a pallet between the same, and levers mounted on said jaws for forcing the stones into the stone sockets of the pallets.

2. A pallet setting and adjusting tool comprising a pair of spring actuated jaws, adjustable jaw faces carried by said jaws for holding the pallet between the same and levers carried by said jaws for operating on the stones of the pallet.

3. A pallet setting and adjusting tool comprising a pair of levers provided with handles, springs for forcing said handles apart, jaw faces carried by said jaws for holding a pallet, and pivoted levers mounted upon the respective jaws for operating upon the pallet stones.

4. A tool of the kind described comprising a pair of spring actuated jaws for holding a pallet between the same, and levers carried by the respective jaws adapted to operate upon the stones of the pallet.

5. A tool of the kind described comprising a pair of jaws provided with enlarged flattened heads, jaw faces adjustably mounted on said jaws for holding the pallet between the jaws, and pivoted levers for operating upon the stones of the pallet.

6. A tool of the kind described comprising a pair of pivoted jaws provided with handles, springs for forcing said handles apart, graduated arms extending outwardly from said jaws, jaw faces mounted upon the jaws for holding a pallet, and levers mounted upon the jaws for operating upon the pallet, said levers working over said graduated arms.

7. A pallet setting and adjusting tool comprising a pair of spring actuated jaws for holding a pallet between the jaws, and a pair of levers with different shaped heads carried by the jaws adapted to operate upon the stones of the pallet, said jaws being provided with graduated arms over which the levers work.

8. A pallet setting and adjusting tool comprising a pair of pivotally connected jaws provided with handles and enlarged heads, jaw faces adjustably mounted upon said jaws provided with notches to receive different shaped pallets, and levers mounted upon said jaws adapted to operate upon said pallet.

9. A pallet setting and adjusting tool comprising a pair of jaws pivotally connected together having handles at one end and enlarged heads at the other ends, a spring for forcing said handles apart, jaw faces adjustably mounted upon said jaws for holding a pallet between the same, levers pivotally mounted upon said jaws for operating upon the stones of the pallet and graduated arms extending outwardly from said jaws for determining the positions of said levers.

10. A pallet setting and adjusting tool comprising a pair of spring actuated jaws provided with adjustable jaw faces upon one side for receiving a pallet and recesses upon the other side for receiving a pallet and levers carried by the jaws adapted to operate upon said pallets.

11. A pallet setting and adjusting tool comprising a pair of spring actuated jaws provided with graduated arms, jaw faces adjustably mounted upon said jaws provided with notches for receiving different style pallets, heating heads formed integral with said jaws at one end and handles at the other end for operating the same, and levers provided with different shaped heads pivotally mounted on the respective jaws for operating upon the respective stones of the pallet, said levers working over graduated arms.

LEMUEL EDWARD GARNETT.

Witnesses:
 B. S. COFEN,
 R. A. LIGHT.